(12) United States Patent
Hoener et al.

(10) Patent No.: US 9,897,469 B2
(45) Date of Patent: Feb. 20, 2018

(54) RESOLVER PHASE COMPENSATION

(71) Applicant: GM GLOBAL TECHNOLOGY OPERATIONS LLC, Detroit, MI (US)

(72) Inventors: Rachel L. Hoener, Orion, MI (US); Yo Chan Son, Rochester Hills, MI (US); Milan Ashok Vadera, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 15/006,757

(22) Filed: Jan. 26, 2016

(65) Prior Publication Data

US 2017/0211949 A1 Jul. 27, 2017

(51) Int. Cl.
*G01D 5/245* (2006.01)
(52) U.S. Cl.
CPC .................... *G01D 5/245* (2013.01)
(58) Field of Classification Search
CPC .... G01D 5/245; G01D 5/24476; G01D 3/032; G01D 5/244; G01R 31/34; G01N 21/274
USPC ...... 324/207.11–207.25, 200, 233, 600, 617, 324/622, 631, 500, 521, 683, 709, 66, 324/76.11, 76.52–76.77, 86, 107
See application file for complete search history.

(56) References Cited

U.S. PATENT DOCUMENTS

| 7,957,942 | B2 * | 6/2011 | Ivchenko | G01D 5/2291 324/207.25 |
| 2015/0276373 | A1 * | 10/2015 | Ide | G01B 7/30 324/207.16 |

OTHER PUBLICATIONS

Analog Devices, Inc., "Variable Resolution, 10-Bit to 16-Bit R/D Converter with Reference Oscillator" Catalog, Item No. AD2S1210, Rev. A, 2008-2010, Norwood, MA, www.analog.com, 36 pps.
Kamel Bouallaga, Lahoucine Idkhajine, Antonio Prata, and Eric Monmasson, Paper Titled "Demodulation Methods on Full FPGA-Based Sysem for Resolver Signals Treatment", EPMI-SATIE, Cergy-Pontoise, France, 6 pps.
Data Device Corporation, Book Titled "Synchro/Resolver Conversion Handbook", Fourth Edition, 1994, Bohemia, New York, www.ddc-web.com, 126 pps.
Ja-Chun Han, Dian Tresna Nugraha, Shi-Nian, On-Chip Delta-Sigma ADC for Rotor Positioning Sensor Application (Resolver-to-Digital Converter), Published by SAE International on Apr. 1, 2014, 6 pages.

* cited by examiner

*Primary Examiner* — Melissa Koval
*Assistant Examiner* — Trung Nguyen
(74) *Attorney, Agent, or Firm* — Quinn IP Law

(57) ABSTRACT

A resolver rotatably coupled to a rotatable member is described, including a method for evaluating an output signal therefrom. This includes supplying an excitation signal to the resolver and dynamically determining corresponding output signals from the resolver. A plurality of datasets are determined, with each dataset including digitized states of the excitation signal supplied to the resolver and corresponding output signals from the resolver. The digitized states of the excitation signal and the corresponding output signals from the resolver for each of the datasets are arithmetically combined, and a moving average thereof is determined. A phase shift error term is determined based upon the moving average, and a phase shift is determined between the excitation signal and the corresponding output signals based upon the phase shift error term.

19 Claims, 8 Drawing Sheets

RESOLVER PHASE COMPENSATION

TECHNICAL FIELD

This disclosure is related to resolvers, and methods and systems for determining rotational positions associated therewith.

BACKGROUND

Devices that include rotatable members may employ resolvers to monitor rotational position and rotational speed of the rotor. By way of non-limiting examples, powertrain systems may employ electrically-powered torque machines to generate tractive torque for propulsion. Known torque machines include multiphase electric motor/generators that electrically couple to energy storage devices via high-voltage electric buses and inverter modules. Torque machines may use resolvers to monitor rotational position and rotational speed, and use such information for control and operation thereof.

A resolver is an electromechanical transducer that includes a rotor having an excitation winding that is coupled to the rotatable member and a stator having secondary windings that are coupled to a non-rotating member of the device, wherein electromagnetic coupling between the primary winding and the secondary windings varies with the rotational position of the rotor. The primary winding may be excited with a sinusoidal signal, which induces differential output signals in the secondary windings. The magnitude of the electrical coupling onto the secondary windings relates to the rotational position of the rotor relative to that of the stator and an attenuation factor known as the resolver transformation ratio. In certain embodiments, the resolver is a variable reluctance resolver, in which an excitation winding is disposed in the stator, and an airgap between the rotor and the stator is modulated on the rotor, which modulates the transformation ratio depending on the rotational position. The output signals from the secondary windings may be phase-shifted by 90 degrees of rotation with respect to each other as a result of the secondary windings being mechanically displaced by 90/PP degrees of mechanical rotation, wherein PP is the quantity of pole pairs of the resolver. Thus, electrical rotation is determined based upon mechanical rotation divided by a quantity of electrical pole pairs. The primary winding may be excited with a sine wave reference signal, which induces differential output signals on the secondary windings. The relationships between the resolver input and the differential output signals may be used to determine a sine and a cosine of the rotational angle of the rotor. Thus, the relationships between the resolver input signal and the resolver output signals may be analyzed to dynamically determine an angular position and rotational speed of the rotor, and thus the rotating member.

Known systems employing resolvers have resolver-to-digital conversion integrated circuit devices to process input signals from the resolver to generate rotational information that may be employed by a controller.

SUMMARY

A resolver rotatably coupled to a rotatable member is described, including a method for evaluating an output signal therefrom. This includes supplying an excitation signal to the resolver and dynamically determining corresponding output signals from the resolver. A plurality of datasets are determined, with each dataset including digitized states of the excitation signal supplied to the resolver and corresponding output signals from the resolver. The digitized states of the excitation signal and the corresponding output signals from the resolver for each of the datasets are arithmetically combined, and a moving average thereof is determined. A phase shift error term is determined based upon the moving average, and a phase shift is determined between the excitation signal and the corresponding output signals based upon the phase shift error term.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2 graphically shows data associated with operation of an embodiment of the resolver described with reference to FIG. 1, including an excitation signal supplied to a primary coil, a first secondary signal generated by a first secondary winding, and a second secondary signal generated by a second secondary winding with the secondary coils positioned in quadrature, in accordance with the disclosure;

DETAILED DESCRIPTION

Figure 1:
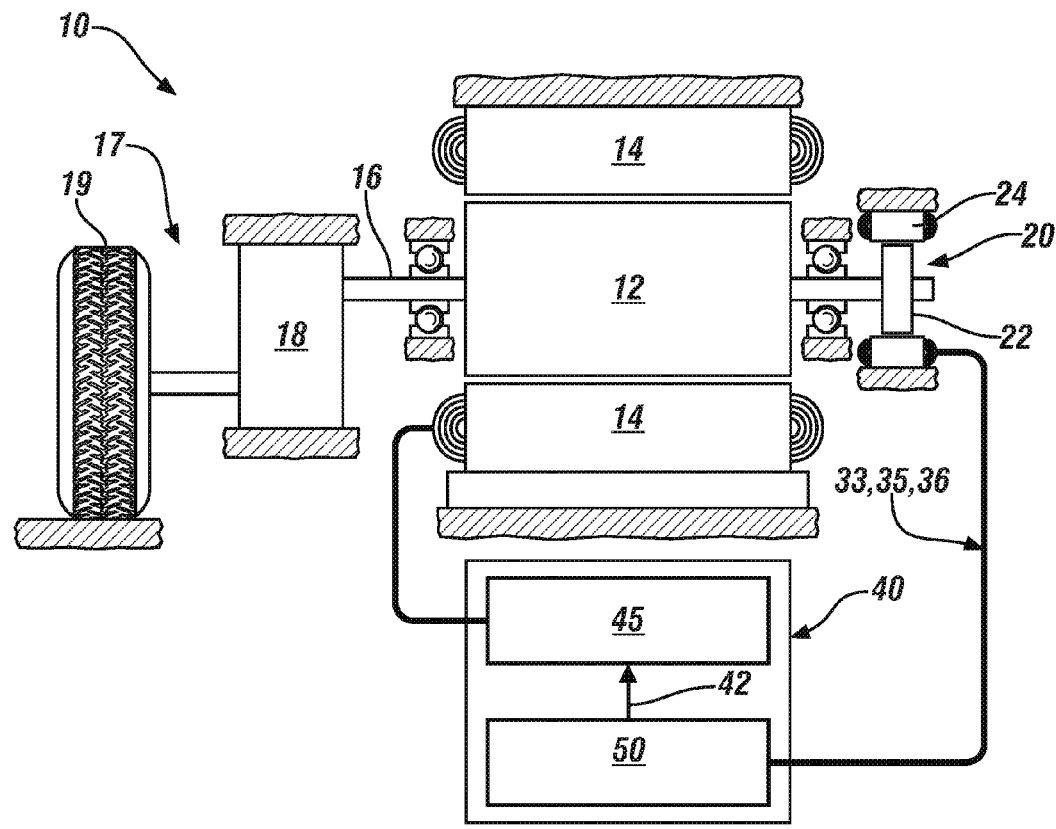
FIGS. 1-1 and 1-2 schematically illustrate a motor control system that includes an electric machine rotatably coupled to a load via a rigid rotatable member that is monitored by a resolver, in accordance with the disclosure.
Figures 1, 2:
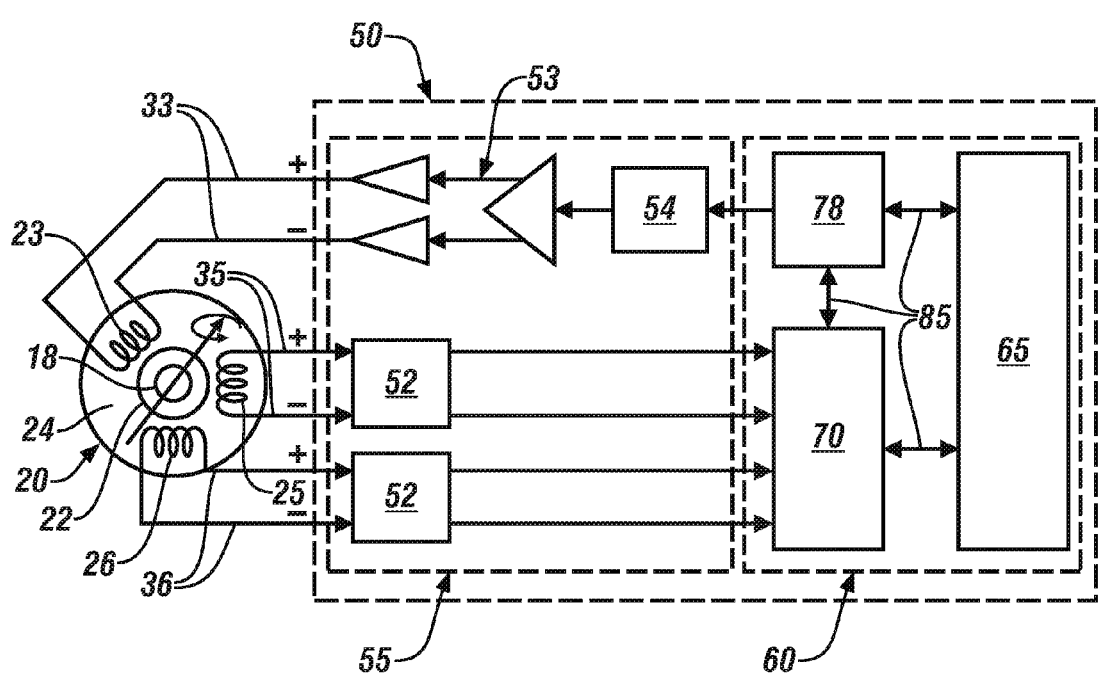
Figure 2:
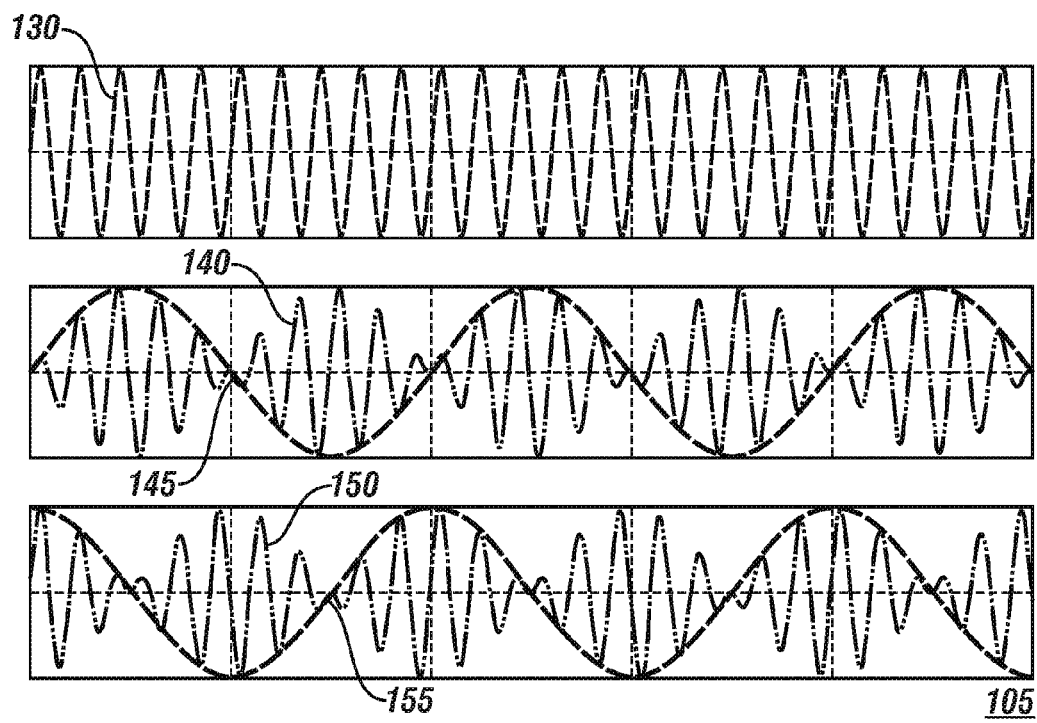

Referring now to the drawings, wherein the depictions are for the purpose of illustrating certain exemplary embodiments only and not for the purpose of limiting the same, FIGS. 1-1 and 1-2 schematically illustrate details of a motor control system for controlling operation of an electric motor 10 that rotatably couples to a load 17 via a rigid rotatable member 16, wherein rotational position of the rotatable member 16 is monitored by a resolver 20 and operation is controlled via a motor controller 40. As shown, the resolver 20 is disposed on a side of the electric motor 10 that is distal from the load 17, but the resolver 20 may be disposed in any suitable location for monitoring rotation of the rotatable member 16. The load 17 may be, by way of a non-limiting example, a gear box 18 coupled to a drive wheel 19 that interacts with a ground surface when employed as part of a powertrain system for a ground vehicle. The concepts described within may apply to any configuration that includes a rotatable member 16 of a device, wherein the rotatable member 16 is monitored by a resolver 20 to determine rotational position and speed thereof.

The electric motor 10 may be any suitable electric motor/generator device, e.g., a permanent magnet device, and includes a stator 14 and a rotor 12. As shown, the stator 14 is an annular device and the rotor 12 is coaxially disposed within and coupled to the rotatable member 16. Alternatively, the rotor 12 may be configured as an annular device with a coaxial stator 14 disposed within. Operation of the electric motor 10 is controlled via the motor controller 40 that preferably includes an inverter 45 in signal communication with a controller 50 via a communication link 42. The inverter 45 electrically connects to the stator 14 of the electric motor 10 to transfer electric power, either to generate torque on the rotor 12 that is transferred to the rotatable member 16, or to react torque on the rotor 12 that is transferred from the rotatable member 16. The controller 50 communicates with the resolver 20 to monitor rotational position of the rotatable member 16.

The resolver 20 includes a resolver rotor 22 that fixedly attaches to the rotatable member 16, and a resolver stator 24 that attaches to a grounding element, e.g., a motor case. The resolver rotor 22 may include a primary electrical winding referred to herein as an excitation winding 23, and the resolver stator 24 includes two secondary electrical windings referred to herein as first and second secondary windings 25, 26, respectively. Alternatively, the resolver 20 may be a variable reluctance resolver having the excitation winding 23 and the first and second secondary windings 25, 26 disposed on the resolver stator 24, wherein the resolver rotor 22 modulates an airgap therebetween to generate output signals on the first and second secondary windings 25, 26.

The excitation winding 23 and the first and second secondary windings 25, 26 operate as variable coupling transformers. In operation, the controller 50 communicates an excitation signal, preferably in the form of an analog sinusoidal reference signal, to the excitation winding 23 via first lines 33. In certain embodiments, the sinusoidal reference signal has a frequency in a range between 1 kHz and 15 kHz. The first and second secondary windings 25, 26 generate first and second output signals in response to the excitation signal, which are communicated via second and third lines 35, 36. When the first and second secondary windings 25, 26 are mechanically rotatably displaced by 90/PP degrees of mechanical rotation, wherein PP is the quantity of pole pairs of the resolver about the axis of rotation of the rotor 12, the first and second output signals generated by the first and second secondary windings 25, 26 are subjected to signal processing that includes digitization and demodulation to determine a rotational angle of the rotor 12 and hence the rotatable member 16. The resolver 20 may be configured with a single pole pair for the first and second secondary windings 25, 26, meaning that 360 degrees of mechanical rotation of the rotatable member 16 generates a signal indicating 360 degrees of electrical rotation from the resolver rotor 22. Alternatively, the resolver 20 may be configured with multiple pole pairs for the first and second secondary windings 25, 26. By way of example, when the resolver 20 is configured with two pole pairs, 180 degrees of mechanical rotation of the rotatable member 16 generates a signal indicating 360 degrees of electrical rotation from the resolver rotor 22, and when the resolver 20 is configured with three pole pairs, 120 degrees of mechanical rotation of the rotatable member 16 generates a signal indicating 360 degrees of electrical rotation from the resolver rotor 22.

The controller 50 includes a microprocessor circuit 60 and an interface circuit 55. The microprocessor circuit 60 preferably includes a dual-core central processing unit (CPU) 65, a pulse generator 78 and a sigma-delta analog-to-digital converter (SDADC) 70 that communicate via an internal parallel communication bus 85. The interface circuit 55 includes signal conditioning circuitry including, e.g., a low-pass filter 54 and differential amplifier 53 that electrically connect via first lines 33 to the excitation winding 23 of the resolver 20. The first and second secondary windings 25, 26 of the resolver 20 communicate via second and third lines 35, 36, respectively, with input lines to the SDADC 70. The second and third lines 35, 36 include respective line filters 52. The pulse generator 78 generates an electrical pulse that is transferred to the excitation winding 23 of the resolver 20 via the signal conditioning circuitry including, e.g., a low-pass filter 54 and differential amplifier 53. The respective line filters 52 remove electromagnetic interference (EMI) noise before being sent to the SDADC 70. The controller 50 communicates with the inverter 45 via the communication link 42.

The excitation winding 23 and the two secondary windings of the first and second secondary windings 25, 26 may operate as variable coupling transformers. In operation, the controller 50 communicates an excitation signal, preferably in the form of an analog sinusoidal reference signal, to the excitation winding 23 via the first lines 33. In certain embodiments, the sinusoidal reference signal has a frequency in a range between 1 kHz and 15 kHz. The excitation signal may be generated by the pulse generator 78 in the form of a square wave reference signal, and passed through the low-pass filter 54 to form the sinusoidal waveform. The second and third lines 35, 36 communicate first and second output signals that are generated by the first and second secondary windings 25, 26 in response to the excitation signal. When the first and second secondary windings 25, 26 are mechanically rotatably displaced by 90/PP degrees of rotation about the axis of rotation of the rotor 12 (wherein PP is the quantity of pole pairs of the resolver), the first and second output signals generated by the first and second secondary windings 25, 26 may be subjected to signal processing that includes digitization and demodulation to determine a rotational angle of the rotor 12.

The motor controller 40 includes the microprocessor circuit 60 and other circuitries to sense the feedback signals such as motor current, input voltage, motor position and speed. The motor controller 40 generates the control signals for the power semiconductor switches of the inverter 45 to generate current that is transferred to the stator 14 via three-phase motor cables 15. The rotation of the rotatable member 16 coincides with the rotation of the rotor 12 and the resolver rotor 22, and the position and speed of the resolver rotor 22 are directly coupled with the position and speed of the rotor 12. As an example of a permanent magnet motor drive system, the resolver rotor 22 is mounted to locate the north pole of the magnet in the rotor 12, permitting the motor controller 40 to control the electric motor 10 in relation to the motor magnet location to maximize the output torque for a given current. Specifically absent from any mechanization of the motor controller 40 described with reference to FIGS. 1-1 and 1-2 is a specialized integrated circuit in the form of a resolver-to-digital converter (RDC). Instead, an RDC system in the form of controller-executable routine(s) is described in detail herein.

The dual-core central processing unit (CPU) 65 and elements such as controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include analog, digitized analog, and discrete signals representing inputs from sensors, actuator commands, and communication between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

A process for evaluating an output signal from an embodiment of the resolver 20 that monitors rotational position of the rotatable member 16 described herein with reference to FIGS. 1-1 and 1-2 is now described, and includes determining a phase shift between the sinusoidal excitation signal and resultant first and second output signals from the resolver 20 employing one or more algorithms. A phase shift between the excitation signal on the excitation winding 23 and the signals from the secondary windings of the first and second secondary windings 25, 26 may be introduced through signal latencies, such as signal filtering and communication delays. If left uncompensated, the phase shift may cause attenuation of the signals in the form of extracted envelopes from the secondary windings of the first and second secondary windings 25, 26 when demodulated. Such attenuation may decrease signal-to-noise ratio, which may increase vulnerability to speed and position errors and affect execution of diagnostic faults.

The phase shift can be compensated for by recursive control of the sinusoidal excitation signal, and the resultant first and second output signals from the resolver may be demodulated to extract rotational speed and position information for the rotatable member 16. The demodulated position information can then be used for purposes of diagnostics and control. As described herein, all of the resolver-to-digital conversion may be accomplished employing algorithms that analyze digitized states of signals collected from the first and second secondary windings 25, 26 via second and third lines 35, 36, respectively.

FIG. 2 graphically shows analog data associated with operation of an embodiment of the resolver 20 in relation to time 105 on the horizontal axis. Operation of the resolver 20 may be modeled as a rotary transformer, including an excitation signal that may be sent to the primary winding of the excitation winding 23 and output signals from the first and second secondary windings 25, 26. The plotted data includes the excitation signal (EXC) 130 supplied to the excitation winding 23, a first secondary signal 140 generated by the first secondary winding 25, and a second secondary signal 150 generated by the second secondary winding 26. The first secondary signal 140 generated by the first secondary winding 25 has an associated first envelope (sine) 145, and the second secondary signal 150 generated by the second secondary winding 26 has an associated second envelope (cosine) 155 when the secondary coils 25, 26 are positioned in quadrature as shown. The amplitudes of the first and second secondary signals 140, 150 transmitted from the respective secondary coils 25, 26 vary sinusoidally as a function of the rotor position. In order to extract position information, the excitation signal EXC 130 that is modulating the sine and cosine signals 150, 155 must be removed by a demodulation algorithm. The demodulated position information can then be used for diagnostic purposes, as well as a determination of the rotational position and speed of the resolver rotor 22.

The sine and cosine signals of the rotational angle may be interpreted to determine a rotational angle of the resolver rotor 22, and hence a rotational angle of the rotatable member 16 and the rotor 12. The motor controller 40 may employ the rotational angle of the rotatable member 16 to control operation of the electric motor 10. It is appreciated that there may be a mechanical error difference between the rotational angle as measured by the resolver 20 and the rotational angle of the rotor 12 in relation to the stator 14 of the electric motor 10 due to resolver offset or mechanical twisting of the rotatable member 16 when torque is applied. Furthermore, there may be an electrical signal error difference between the rotational angle as measured by the resolver 20 and the rotational angle of the rotor 12 in relation to the stator 14 of the electric motor 10 due to signal latencies, such as signal filtering and communication delays.

The first and second output signals generated by the first and second secondary windings 25, 26 in response to the excitation signal and communicated on the second and third lines 35, 36 are analog signals. The analog signals may be converted to a digital signal indicating rotational position and speed of the rotatable member 16 employing the motor controller 40.

Figure 3:
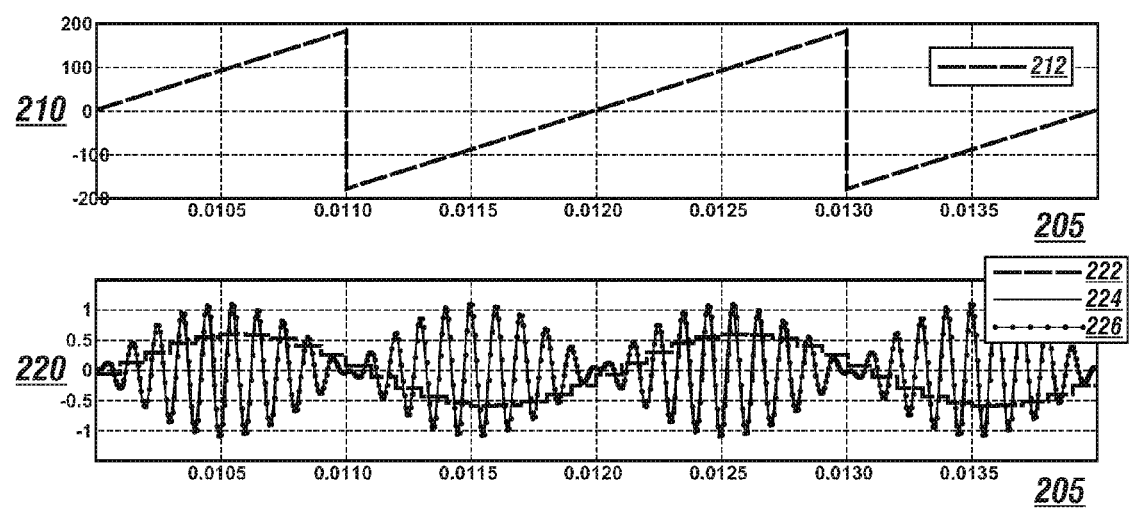
FIG. 3 graphically shows data associated with operation of an embodiment of the resolver described with reference to FIG. 1, including a secondary signal generated by a secondary coil that is analogous to the signals described with reference to FIG. 2, wherein the data includes a raw analog data, digitized data associated with the raw analog data, and envelope data extracted from the digitized data, in accordance with the disclosure.

FIG. 3 graphically shows data associated with a secondary signal generated by a secondary coil in response to an excitation signal. Multiple cycles are shown. The secondary signal may be analogous to either of the first secondary signal 140 generated by the first secondary winding 25 or the second secondary signal 150 generated by the second secondary winding 26, as described with reference to FIG. 2. The data is generated by rotation of the rotor 12 and the resolver rotor 22. As shown, data in the form of a rotational position 210 and a secondary signal 220 are shown in relation to time, which is indicated on the horizontal axis 205. The rotational position 210 includes a raw position 212. The secondary signal 220 may be generated by the first secondary winding 25 in response to the excitation signal and includes a raw signal 222 that is output from the first secondary winding 25, a sampled signal 226, which includes discrete points of the raw signal 222 that are digitally sampled, and an extracted envelope signal 224, which includes the raw signal 222 that is demodulated to remove the excitation signal. The phase shift is between the excitation signal and the resultant first and second output signals from the resolver 20. If left uncompensated, the phase shift may cause attenuation of the extracted envelope signals from the secondary windings of the first and second secondary windings 25, 26 when demodulated.

Figure 4:
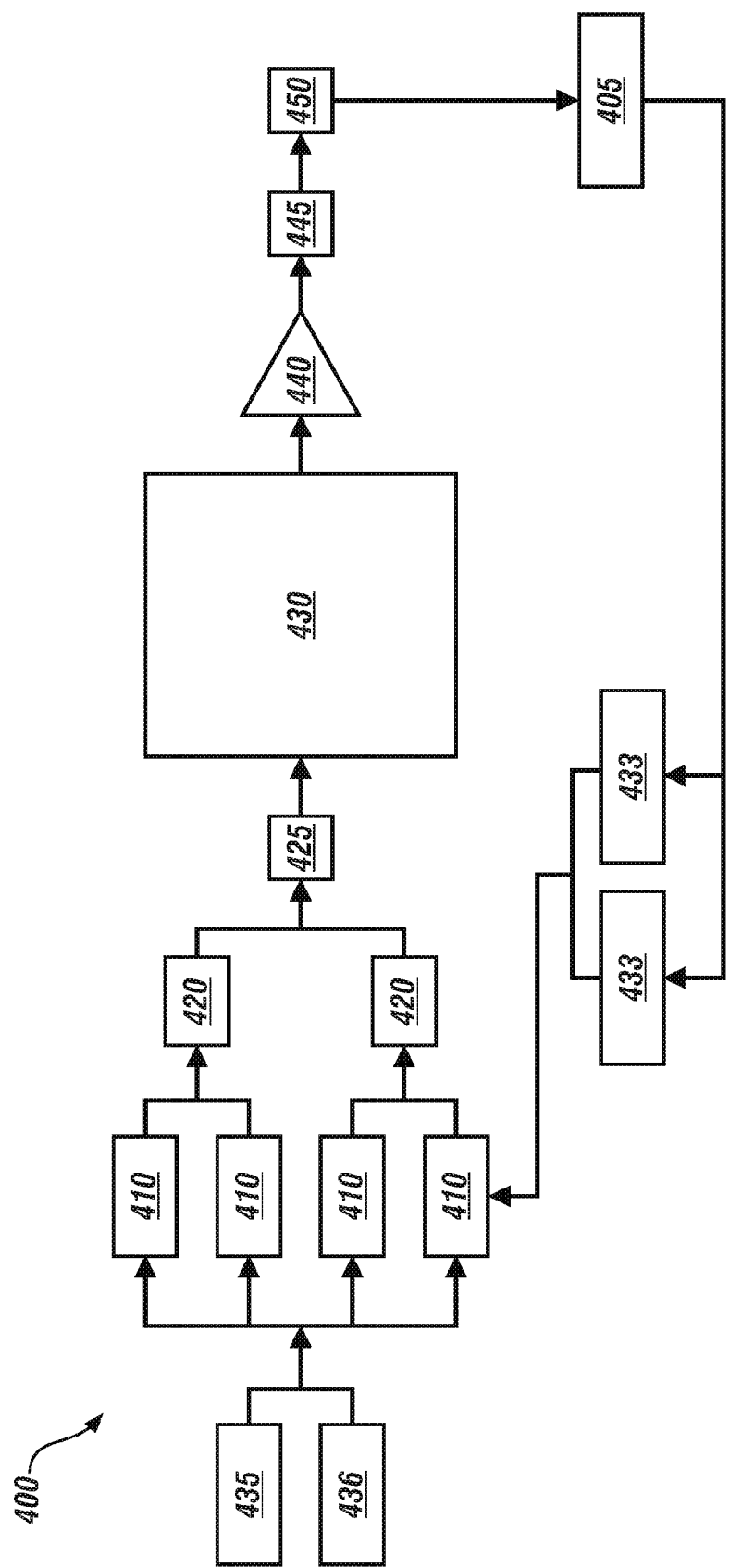
FIGS. 4 through 9 each schematically show an embodiment of a phase shift determination and compensation routine in block diagram form that monitors and processes signal outputs from a resolver to determine and compensate for an angular phase shift between an actual rotational position of the rotatable member and a rotational position of the rotatable member as indicated by the resolver, in accordance with the disclosure.

FIG. 4 schematically shows an embodiment of a first phase shift determination and compensation routine (first routine) 400 in block diagram form that monitors and processes signal outputs from a resolver 20 to determine and compensate for an angular phase shift between the sinusoidal excitation signal and resultant first and second output signals from the resolver 20. The first routine 400 may be executed as one or more algorithms or control routines in an embodiment of the controller 50 to process signal outputs from the resolver 20 that are described with reference to FIGS. 1, 2 and 3. In operation, this includes dynamically supplying a sinusoidal excitation signal 433 to the resolver 20 from an excitation phase 405 and monitoring output signals sine 435 and cosine 436 collected from the first and second secondary windings 25, 26 of the resolver 20. A plurality of datasets are determined, wherein each dataset includes digitized states of the sinusoidal excitation signal 433 and the time-correspondent first and second output signals sine 435 and cosine 436 from the resolver 20.

The first routine 400 employs the first and second output signals sine 435 and cosine 436 that are output from the secondary windings 25, 26, respectively of the resolver 20, as follows:

$$\sin(\theta)*\sin(\omega t+\beta) \text{ and}$$

$$\cos(\theta)*\sin(\omega t+\beta),$$

wherein:
 ω is the frequency of the excitation signal,
 β is the resolver phase shift, and
 θ is the position of the rotor at time t.

The sine 435 and cosine 436 signals are read from an input buffer of an analog/digital converter that communicates with the resolver controller 30, preferably at a known sampling rate. In one embodiment, and as shown, the sampling rate yields sixteen samples per excitation cycle. The input buffer preferably includes a plurality of datasets, wherein each of the datasets includes digitized states of the sinusoidal excitation signal supplied to the resolver 20 and time-correspondent first and second output signals from the resolver 20.

The sine and cosine values of the excitation signal 433 may be estimated from a lookup table, and expressed as follows:

$$\sin(\omega t+\varphi) \text{ and}$$

$$\cos(\omega t+\varphi)$$

wherein:
 ω is the frequency of the excitation signal, and
 φ is the estimated phase shift correction.

During an initial execution of the first routine 400, the estimated phase shift correction φ may be set to zero, indicating that no phase shift correction has been estimated. One portion of the first routine 400 includes converging the estimated phase shift correction φ towards the resolver phase shift β during recursive executions so that the estimated excitation signal accurately accounts for the resolver phase shift for demodulation during resolver-to-digital conversion. In this embodiment, the sine 435 and cosine 436 from the resolver 20 and the sine and cosine signals from the estimated excitation signal 433 are employed.

A combining operation is executed, and includes arithmetically combining the digitized states of the excitation signal and the corresponding first and second output signals from the resolver 20 for each of the datasets. This includes calculating four products (410), as follows:

$$\text{SinEnv}=\sin(\theta)*\sin(\omega t+\beta)*\sin(\omega t+\varphi),$$

$$\text{CosEnv}=\cos(\theta)*\sin(\omega t+\beta)*\sin(\omega t+\varphi),$$

$$\text{SinQuad}=\sin(\theta)*\sin(\omega t+\beta)*\cos(\omega t+\varphi), \text{ and}$$

$$\text{CosQuad}=\cos(\theta)*\sin(\omega t+\beta)*\cos(\omega t+\varphi).$$

By trigonometric manipulation, these signals may be equivalently written as follows:

$$\text{SinEnv}=\sin(\theta)*\tfrac{1}{2}[\cos((\beta-\varphi)\cos(2\omega t+\beta+\varphi)],$$

$$\text{CosEnv}=\cos(\theta)*\tfrac{1}{2}[\cos(\beta-\varphi)\cos(2\omega t+\beta+\varphi)],$$

$$\text{SinQuad}=\sin(\theta)*\tfrac{1}{2}[\sin(2\omega t+\beta+\varphi)+\sin(\beta-\varphi)], \text{ and}$$

$$\text{CosQuad}=\cos(\theta)*\tfrac{1}{2}[\sin(2\omega t+\beta+\varphi)+\sin(\beta-\varphi)].$$

Products may be calculated as follows (420):

$$\text{SinEnv}*\text{SinQuad}=\sin(\theta)^2*\tfrac{1}{4}[\cos(\beta-\varphi)*\sin(2\omega t+\beta+\varphi)+\cos(\beta-\varphi)*\sin(\beta-\varphi)-\cos(2\omega t+\beta+\varphi)*\sin(2\omega t+\beta+\varphi)-\cos(2\omega t+\beta+\varphi)*\sin(\beta-\varphi)], \text{ and}$$

$$\text{CosEnv}*\text{CosQuad}=\cos(\theta)^2*\tfrac{1}{4}[\cos(\beta-\varphi)*\sin(2\omega t+\beta+\varphi)+\cos(\beta-\varphi)*\sin(\beta-\varphi)\cos(2\ \omega t+\beta+\varphi)*\sin(2\omega t+\beta+\varphi)-\cos(2\omega t+\beta+\varphi)*\sin(\beta-\varphi)], \text{respectively.}$$

When these two products are summed (425), the rotor position information is cancelled out by the identity:

$$\sin(\theta)^2+\cos(\theta)^2=1,$$

The remainder is as follows:

$$\tfrac{1}{4}[\cos(\beta-\varphi)*\sin(2\omega t+\beta+\varphi)+\cos(\beta-\varphi)*\sin(\beta-\varphi)-\cos(2\omega t+\beta+\varphi)*\sin(2\omega t+\beta+\varphi)-\cos(2\omega t+\beta+\varphi)*\sin(\beta-\varphi)].$$

A moving average of the arithmetically combined digitized states of the excitation signal and the corresponding first and second output signals from the resolver for a single period of the sinusoidal excitation signal is calculated (430).

This includes initially neglecting the factor of ¼. The term $\cos(\beta-\varphi)*\sin(2\omega t+\beta+\varphi)$ cancels out because $\cos(\beta-\varphi)$ is a constant, and any constant multiple of $\sin(2\omega t+\beta+\varphi)$ averages to zero over the excitation cycle. The term $\cos(\beta-\varphi)*\sin(\beta-\varphi)$ is a constant and therefore leaves the moving average unchanged.

The term $\cos(2\omega t+\beta+\varphi)*\sin(2\omega t+\beta+\varphi)$ can be trigonometrically manipulated to $\tfrac{1}{2}\sin(4\omega t+2\beta+2\varphi)$ employing the identity $\sin(2u)=2*\sin(u)*\cos(u)$. The resultant cancels out because it averages to zero over the excitation cycle. The term cos(2ωt+β+φ)*sin(β−φ)] cancels out because sin(β−φ) is a constant, and any constant multiple of cos(2ωt+β+φ) averages to zero over the excitation. Therefore, after the moving average is calculated, what remains is ¼*cos(β−φ)*sin(β−φ).

Furthermore, the term ¼*cos(β−φ)*sin(β−φ) can be trigonometrically manipulated to ⅛ sin(2β−2φ) using the identity sin(2u)=2*sin(u)*cos(u).

Using small angle approximation, the following relationship can be derived:

⅛ sin(2β−2φ)≈¼(β−φ).

This relationship provides a term proportional to the error (β−φ) between the resolver phase shift β and the estimated phase shift correction φ after a gain term is applied (440). This error term is integrated (445) and added to the estimated phase shift correction φ, as part of the excitation phase 405 such that the estimated phase shift correction φ will converge on the resolver phase shift β over multiple iterations of the first routine 400 (450). Thus, a phase shift error term may be determined based upon the moving average in conjunction with other arithmetic operations and trigonometric manipulations, and a phase shift may be determined between the sinusoidal excitation signal and the time-correspondent output signals based upon the phase shift error term.

Figure 5:
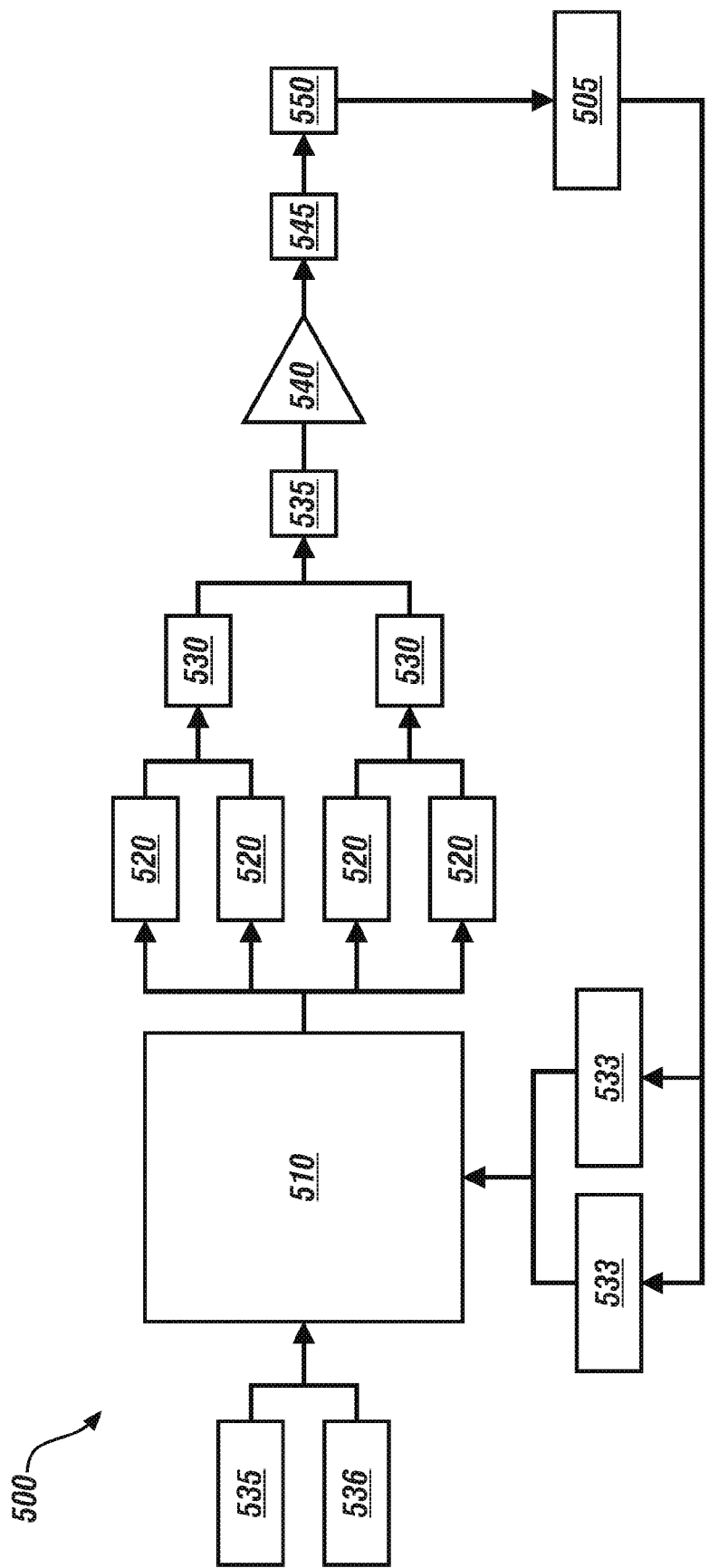

FIG. 5 schematically shows an embodiment of a second phase shift determination and compensation routine (second routine) 500 in block diagram form that monitors and processes signal outputs from the resolver 20 to determine and compensate for an angular phase shift between the sinusoidal excitation signal and resultant first and second output signals from the resolver 20. The second routine 500 may be executed as one or more algorithms or control routines in an embodiment of the resolver controller 30 to process signal outputs from the resolver 20 that is described with reference to FIG. 1. In operation, this includes dynamically supplying a sinusoidal excitation signal 533 to the resolver 20 from an excitation phase 505 and monitoring output signals sine 535 and cosine 536 collected from the first and second secondary windings 25, 26 of the resolver 20. A plurality of datasets are determined, wherein each dataset includes digitized states of the sinusoidal excitation signal 533 and the time-correspondent first and second output signals sine 535 and cosine 536 from the resolver 20.

The second routine 500 employs raw sine and cosine signals that are output from the secondary windings 25, 26, respectively of the resolver 20 employing the same trigonometric manipulations as previously described in routine 400, but moving average calculations are performed (510) closer to the inputs. The second routine 500 approximates the sin(θ) and cos(θ) as constants over a single excitation cycle, due to the rotor speed being substantially slower than the excitation frequency. The products SinEnv, CosEnv, SinQuad, and CosQuad are calculated as described with reference to the first routine 400 (520), and then each of the four signals is passed through a moving average over the 16 samples per excitation cycle. The 2ωt terms in each signal are averaged to zero, using the approximation that sin(θ) and cos(θ) are constant over each excitation cycle. Then what remains of each signal is as follows:

SinEnv=sin(θ)*½*cos(β−φ),

CosEnv=cos(θ)*½*cos(β−φ),

SinQuad=sin(θ)*½*sin(β−φ), and

CosQuad=cos(θ)*½*sin(β−φ).

Next, the products are calculated (530) as follows:

SinEnv*SinQuad=sin(θ)²*¼*sin(β−φ)*cos(β−φ), and

CosEnv*CosQuad=cos(θ)²*¼*sin(β−φ)*cos(β−φ).

When these two products are summed (535), the rotor position information is cancelled out by the identity sin(θ)²+cos(θ)²=1, and what remains is ¼*sin(β−φ)*cos(β−φ). This can be trigonometrically manipulated to ⅛ sin(2β−2φ) using the identity sin(2u)=2*sin(u)*cos(u). Using the small angle approximation, ⅛ sin(2β−2φ)≈¼(β−φ). A term proportional to the error (β−φ) between the resolver phase shift β and the estimated phase shift correction φ is determined, and a gain term is applied (540).

This relationship provides a term proportional to the error (β−φ) between the resolver phase shift β and the estimated phase shift correction φ. This error term is integrated (545) and added to the estimated phase shift correction φ, as part of the excitation phase 505 such that the estimated phase shift correction φ will converge on the resolver phase shift β over multiple iterations of the second routine 500 (550). Thus, a phase shift error term may be determined based upon the moving averages in conjunction with other arithmetic operations and trigonometric manipulations, and a phase shift may be determined between the sinusoidal excitation signal and the corresponding output signals based upon the phase shift error term.

Figure 6:
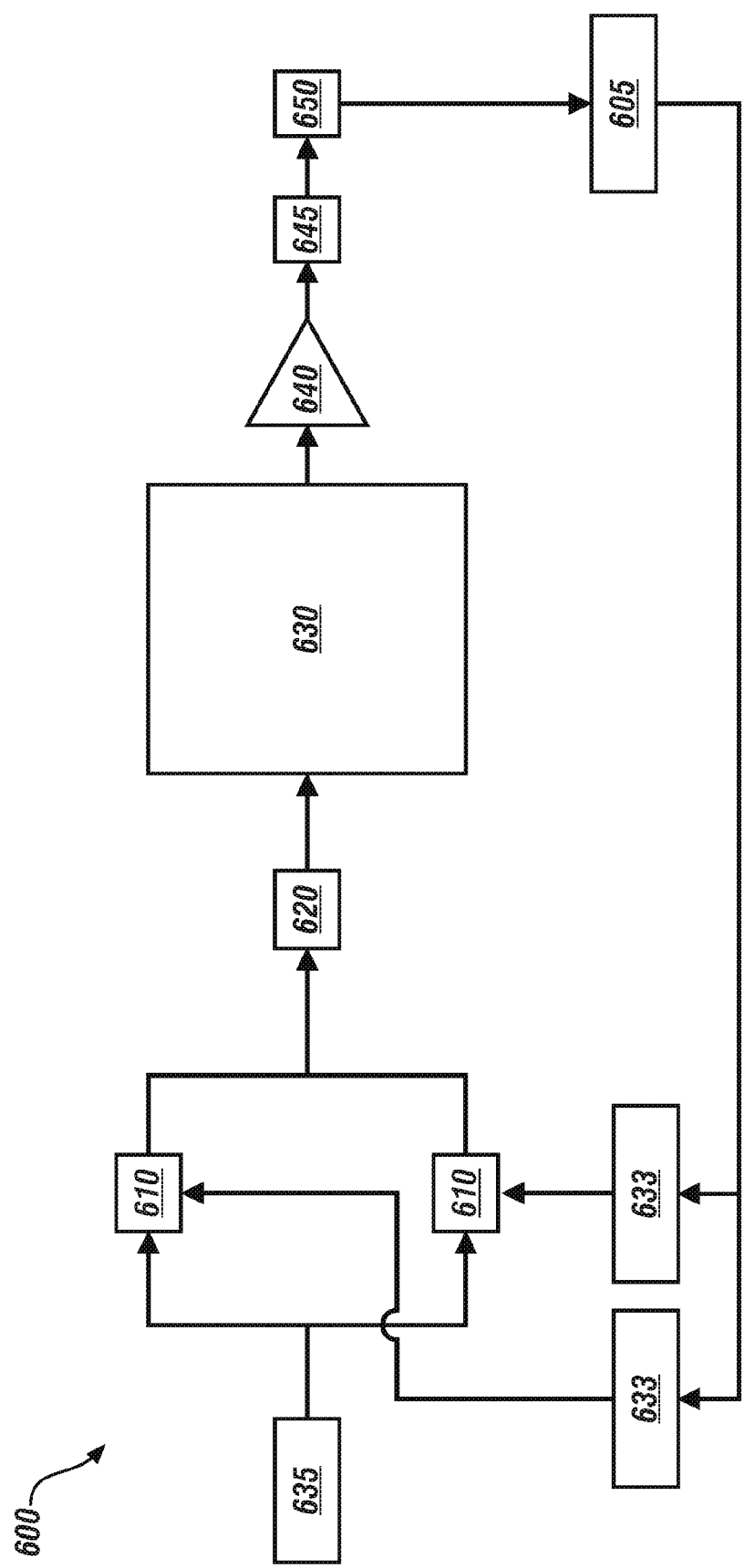

FIG. 6 schematically shows an embodiment of another phase shift determination and compensation routine (third routine) 600 in block diagram form that monitors and processes signal outputs from the resolver 20 to determine and compensate for an angular phase shift between the sinusoidal excitation signal and resultant first and second output signals from the resolver 20. The third routine 600 may be executed as one or more algorithms or control routines in an embodiment of the resolver controller 30 to process signal outputs from the resolver 20 that is described with reference to FIG. 1. In operation, this includes dynamically supplying a sinusoidal excitation signal 633 to the resolver 20 from an excitation phase 605 and monitoring the output signal sine 635 collected from the first secondary winding 25 of the resolver 20. A plurality of datasets are determined, wherein each dataset includes digitized states of the sinusoidal excitation signal 633 and the time-correspondent first output signal sine 635 from the resolver 20.

The third routine 600 employs the first output signal sine 635 from the secondary winding 25 of the resolver 20, as follows:

sin(θ)*sin(ωt+β)

wherein:
ω is the frequency of the excitation signal,
β is the resolver phase shift, and
θ is the position of the rotor at time t.

The sine 635 signal is read from an input buffer of an analog/digital converter that communicates with the resolver controller 30, preferably at a known sampling rate. In one embodiment, and as shown, the sampling rate yields sixteen samples per excitation cycle. The input buffer preferably includes a plurality of datasets, wherein each of the datasets includes digitized states of the sinusoidal excitation signal supplied to the resolver 20 and the time-correspondent first output signal from the resolver 20.

The sine and cosine values of the excitation signal 633 may be estimated from a lookup table, and expressed as follows:

$$\sin(\omega t + \varphi) \text{ and}$$

$$\cos(\omega t + \varphi)$$

wherein:
  $\omega$ is the frequency of the excitation signal, and
  $\varphi$ is the estimated phase shift correction.

During an initial execution of the third routine 600, the estimated phase shift correction $\varphi$ may be set to zero, indicating that no phase shift correction has been estimated. One part of the routine is to have the estimated phase shift correction $\varphi$ to converge on the resolver phase shift $\beta$ during recursive executions of the third routine 600 so that the estimated excitation signal accurately accounts for the resolver phase shift in demodulation during resolver-to-digital conversion. In this embodiment, only the sine 635 from the resolver 20 and the sine and cosine signals from the estimated excitation signal 633 are employed.

FIG. 6 is schematically shown in block diagram form. The third routine 600 employs that portion of the first routine 400 associated with the sine 635 signal and introduces some additional computations to remove rotor position information independently from cos. Since only sine (and not cosine) is used in this method, it is immune to any amplitude imbalance between sine and cos. The third routine 600 approximates the $\sin(\theta)$ as a constant value over a single excitation cycle, due to the rotor speed being substantially slower than the excitation frequency. The third routine 600 uses sine from the resolver 20 as well as both the sine and cosine of the estimated excitation. Using these three signals, two products are calculated, as follows (610, 620):

$$\text{SinEnv} = \sin(\theta) * \sin(\omega t + \beta) * \sin(\omega t + \varphi) \text{ and}$$

$$\text{SinQuad} = \sin(\theta) * \sin(\omega t + \beta) * \cos(\omega t + \varphi).$$

By trigonometric manipulation, these signals may be equivalently written as follows:

$$\text{SinEnv} = \sin(\theta) * \tfrac{1}{2} [\cos(\beta - \varphi) \cos(2\omega t + \beta + \varphi)] \text{ and}$$

$$\text{SinQuad} = \sin(\theta) \tfrac{1}{2} [\sin(2\omega t + \beta + \varphi) + \sin(\beta - \varphi)].$$

From SinEnv and SinQuad, two derived signals SinNum and SinDenom are calculated:

$$\text{SinNum} = \text{SinEnv} * \text{SinQuad} = \sin(\theta)^2 * \tfrac{1}{4} [\cos(\beta - \varphi) * \sin(2\omega t + \beta + \varphi) + \sin(\beta - \varphi) * \cos(\beta - \varphi) \sin(2\omega t + \beta + \varphi) * \cos(2\omega t + \beta + \varphi) - \sin(\beta - \varphi) * \cos(2\omega t + \beta + \varphi)]; \text{ and}$$

$$\text{SinDenom} = \text{SinEnv}^2 + \text{SinQuad}^2 = \sin(\theta)^2 * \tfrac{1}{4} [\cos(\beta - \varphi)^2 - 2 * \cos(\beta - \varphi) * \cos(2\omega t + \beta - \varphi) + \cos(2\omega t + \beta - \varphi)^2 + \sin(2\omega t + \beta - \varphi)^2 + 2 * \sin(\beta - \varphi) * \sin(2\omega t + \beta + \varphi) + \sin(\beta - \varphi)^2].$$

The signal SinDenom can be further reduced as follows:

$$\sin(\theta)^2 * \tfrac{1}{4} [2 - 2 * \cos(\beta - \varphi) * \cos(2\omega t + \beta - \varphi) + 2 * \sin(\beta - \varphi) * \sin(2\omega t + \beta + \varphi)]$$

using the identity $\sin(u)^2 + \cos(u)^2 = 1$ on the two sets of squared terms located inside the brackets.

Next, SinNum and SinDenom are passed through a moving average over the 16 samples per excitation cycle (630). The $2\omega t$ terms in each signal are averaged to zero, using the assumption that $\sin(\theta)$ is approximately constant over an excitation cycle. What remains of each signal is as follows:

$$\text{SinNum} = \sin(\theta)^2 * \tfrac{1}{4} * \sin(\beta - \varphi) * \cos(\beta - \varphi) \text{ and}$$

$$\text{SinDenom} = \sin(\theta)^2 * \tfrac{1}{4} * 2 = \sin(\theta)^2 * \tfrac{1}{2}.$$

The SinNum term is divided by SinDenom in order to eliminate $\sin(\theta)^2$ This operation can only be done when $\sin(\theta)^2 \neq 0$.

The resulting signal is $\tfrac{1}{2} * \sin(\beta - \varphi) * \cos(\beta - \varphi)$, which becomes $\tfrac{1}{4} \sin(2\beta - 2\varphi)$ when using the identity $\sin(2u) = 2 * \sin(u) * \cos(u)$. The term $\tfrac{1}{4} \sin(2\beta - 2\varphi)$ is approximated as follows:

$$\tfrac{1}{4} \sin(2\beta - 2\varphi) \approx \tfrac{1}{2}(\beta - \varphi)$$

using small angle approximation, and a gain term is applied (640).

This relationship provides a term proportional to the error $(\beta - \varphi)$ between the resolver phase shift and the estimated phase shift correction $\varphi$. This error term is integrated (645) and added to the estimated phase shift correction $\varphi$, as part of the excitation phase 605 such that the estimated phase shift correction $\varphi$ will converge on the resolver phase shift $\beta$ over multiple iterations of the third routine 600 (650). Thus, a phase shift error term may be determined based upon the moving averages in conjunction with other arithmetic operations and trigonometric manipulations, and a phase shift may be determined between the sinusoidal excitation signal and the corresponding output signals based upon the phase shift error term.

Figure 7:
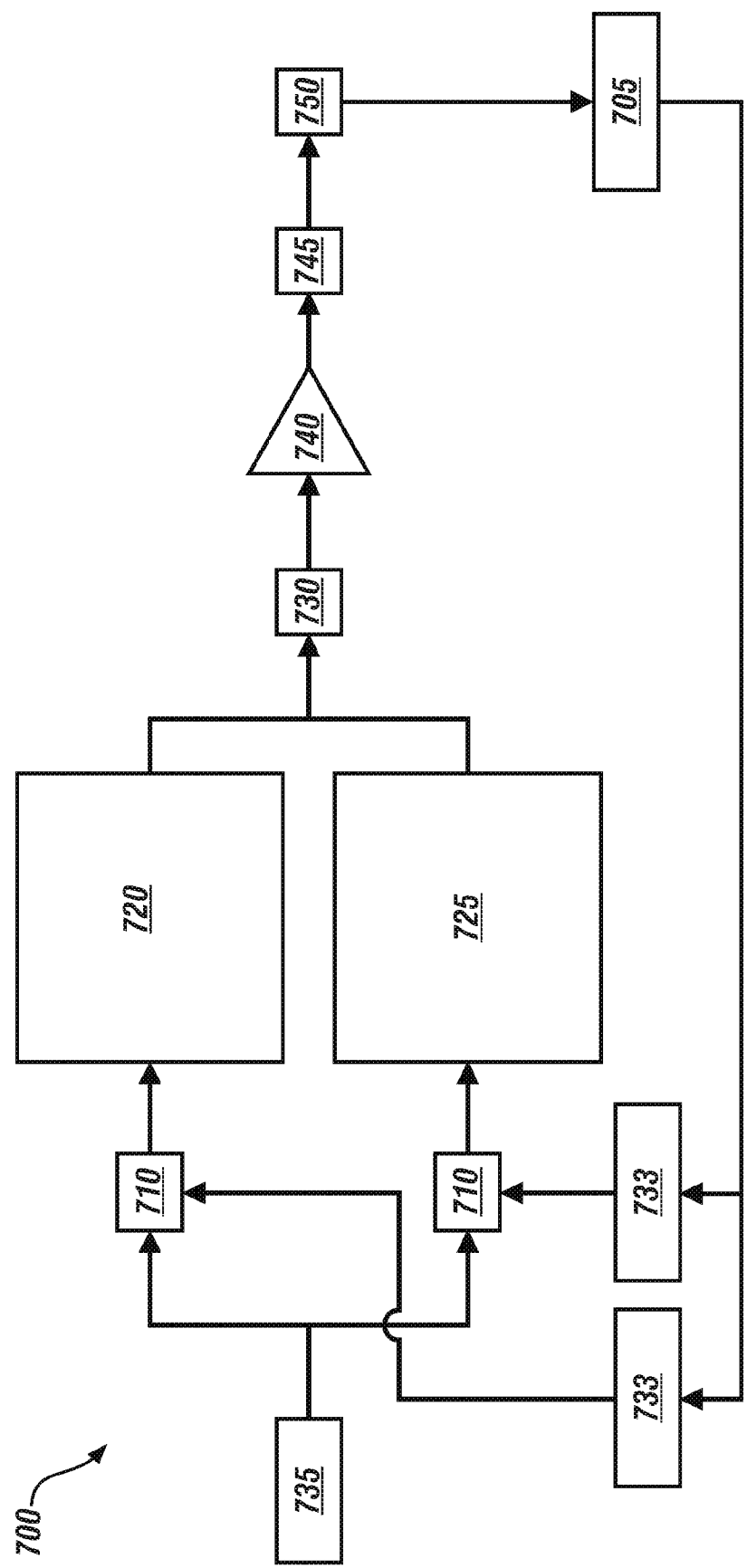

FIG. 7 schematically shows an embodiment of another phase shift determination and compensation routine (fourth routine) 700 in block diagram form that monitors and processes signal outputs from the resolver 20 to determine and compensate for an angular phase shift between an angular phase shift between the sinusoidal excitation signal and resultant first and second output signals from the resolver 20. The fourth routine 700 may be executed as one or more algorithms or control routines in an embodiment of the resolver controller 30 to process signal outputs from the resolver 20 that is described with reference to FIG. 1. In operation, this includes dynamically supplying a sinusoidal excitation signal 733 to the resolver 20 from an excitation phase 705 and monitoring output signal sine 735 collected from the first secondary winding 25 of the resolver 20. A plurality of datasets are determined, wherein each dataset includes digitized states of the sinusoidal excitation signal 733 and the time-correspondent first output signal sine 735 from the resolver 20.

This method uses sine from the resolver 20 as well as both the sine and cosine of the estimated excitation. It employs the same trigonometric manipulations as described with reference to the third routine 600, but moving averages are performed closer to the inputs. Since only sine (and not cosine) is used in this method, it is immune to any amplitude imbalance between sine and cos. Like the third routine 600, the fourth routine 700 approximates the $\sin(\theta)$ as a constant over a single excitation cycle, due to the rotor speed being substantially slower than the excitation frequency. The products SinEnv and SinQuad are calculated (710) as described with reference to the third routine 600, and then both signals are passed through a moving average over the 16 samples per excitation cycle (720, 725). The $2\omega t$ terms in each signal are averaged to zero, using the assumption that $\sin(\theta)$ is approximately constant over an excitation cycle (730). Then what remains of each signal is:

$$\text{SinEnv} = \sin(\theta) * \tfrac{1}{2} * \cos(\beta - \varphi) \text{ and}$$

$$\text{SinQuad} = \sin(\theta) * \tfrac{1}{2} * \sin(\beta - \varphi).$$

From SinEnv and SinQuad, two derived signals SinNum and SinDenom are calculated as follows:

SinNum=SinEnv*SinQuad=sin$(\theta)^{2}$*¼*sin$(\beta-\varphi)$*cos$(\beta-\varphi)$ and SinDenom=SinEnv$^{2}$+SinQuad$^{2}$=sin$(\theta)^{2}$*¼*cos$(\beta-\varphi)^{2}$+sin$(\theta)^{2}$*¼*sin$(\beta-\varphi)^{2}$=sin$(\theta)^{2}$*¼*[sin$(\beta-\varphi)^{2}$+cos$(\beta-\varphi)^{2}$].

The term SinDenom can be further reduced to sin$(\theta)^{2}$*¼ using the identity sin$(u)^{2}$+cos$(u)^{2}$=1 on the set of squared terms located inside the brackets. Finally, SinNum is divided by SinDenom in order to eliminate sin$(\theta)^{2}$, which can only be done when sin$(\theta)^{2} \neq 0$. The resulting signal is sin$(\beta-\varphi)$*cos$(\beta-\varphi)$ which, using the identity sin(2u)=2*sin(u)*cos(u), becomes ½ sin$(2\beta-2\varphi)$. Using the small angle approximation, ½ sin$(2\beta-2\varphi) \approx (\beta-\varphi)$, and a gain term is applied (740).

This relationship provides a term proportional to the error $(\beta-\varphi)$ between the resolver phase shift β and the estimated phase shift correction φ. This error term is integrated (745) and added to the estimated phase shift correction φ, as part of the excitation phase 705 such that the estimated phase shift correction φ will converge on the resolver phase shift β over multiple iterations of the fourth routine 700 (750). Thus, a phase shift error term may be determined based upon the moving averages in conjunction with other arithmetic operations and trigonometric manipulations, and a phase shift may be determined between the sinusoidal excitation signal and the corresponding output signals based upon the phase shift error term.

Figure 8:
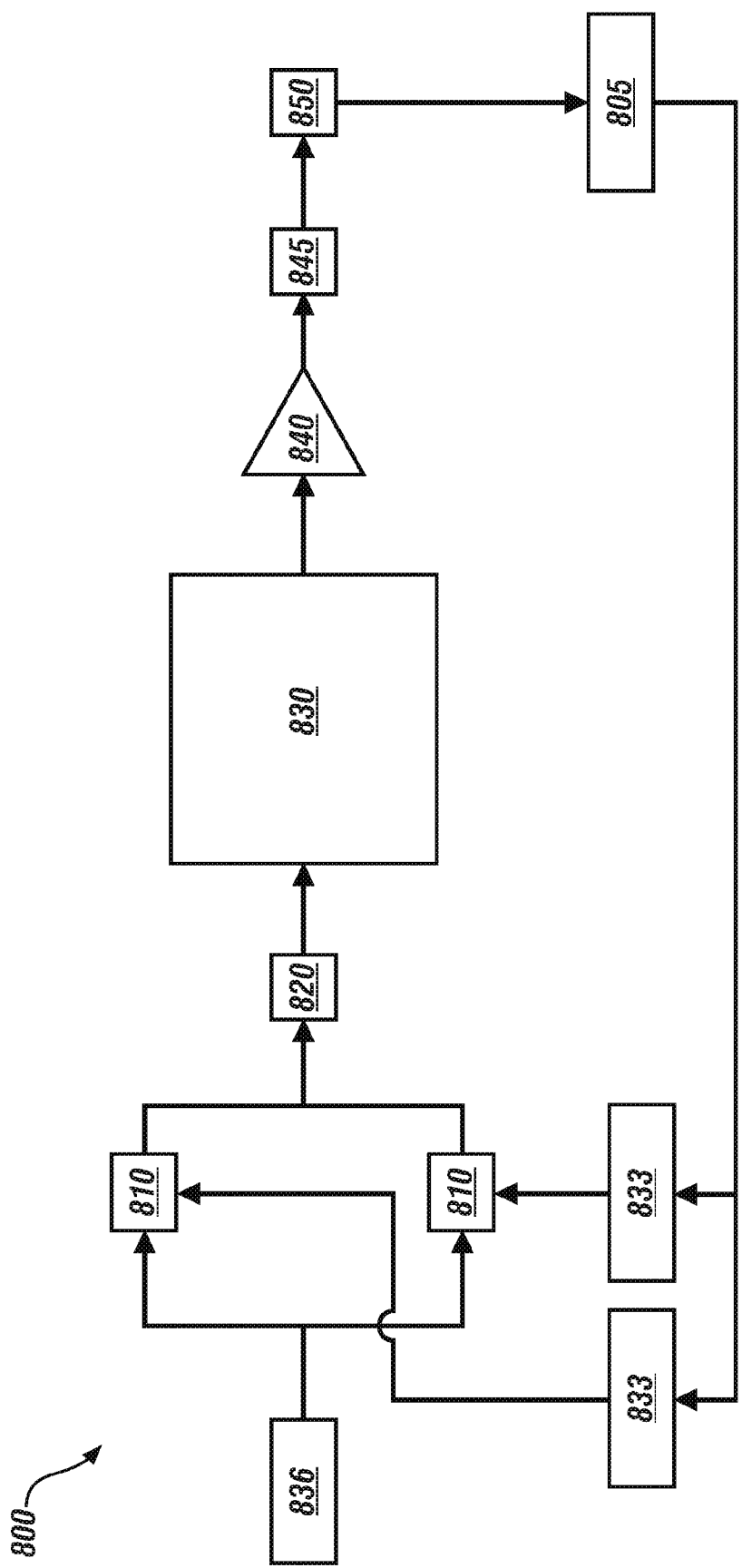

FIG. 8 schematically shows an embodiment of another phase shift determination and compensation routine (fifth routine) 800 in block diagram form that monitors and processes signal outputs from the resolver 20 to determine and compensate for an angular phase shift between the sinusoidal excitation signal and resultant first and second output signals from the resolver 20. The fifth routine 800 may be executed as one or more algorithms or control routines in an embodiment of the resolver controller 30 to process signal outputs from the resolver 20 that is described with reference to FIG. 1. In operation, this includes dynamically supplying a sinusoidal excitation signal 833 to the resolver 20 from an excitation phase 805 and monitoring output signal cosine 836 collected from the first secondary winding 25 of the resolver 20. A plurality of datasets are determined, wherein each dataset includes digitized states of the sinusoidal excitation signal 833 and the time-correspondent second output signal cosine 836 from the resolver 20.

The fifth routine 800 employs the first output signal cosine 836 from the secondary winding 25 of the resolver 20, as follows:

$$\cos(\theta)*\sin(\omega t+\beta)$$

wherein:
ω is the frequency of the excitation signal,
β is the resolver phase shift, and
θ is the position of the rotor at time t.

The cosine 836 signal is read from an input buffer of an analog/digital converter that communicates with the controller 50, preferably at a known sampling rate. In one embodiment, and as shown, the sampling rate yields sixteen samples per excitation cycle. The input buffer preferably includes a plurality of datasets, wherein each of the datasets includes digitized states of the sinusoidal excitation signal supplied to the resolver 20 and corresponding second output signal from the resolver 20.

The sine and cosine values of the excitation signal 833 may be estimated from a lookup table, and expressed as follows:

$$\sin(\omega t+\varphi) \text{ and}$$

$$\cos(\omega t+\varphi)$$

wherein:
ω is the frequency of the excitation signal, and
φ is the estimated phase shift correction.

During an initial execution of the fifth routine 800, the estimated phase shift correction φ may be set to zero, indicating that no phase shift correction has been estimated. One part of the routine is to have the estimated phase shift correction φ to converge on the resolver phase shift β during recursive executions of the fifth routine 800 so that the estimated excitation signal accurately accounts for the resolver phase shift in demodulation during resolver-to-digital conversion. In this embodiment, only the cosine 836 from the resolver 20 and the sine and cosine signals from the estimated excitation signal 833 are employed.

FIG. 8 is schematically shown in block diagram form. The fifth routine 800 employs that portion of the first routine 400 associated with the cosine 836 signal and introduces some additional computations to remove rotor position information independently from cos. Since only cosine (and not sine) is used in this method, it is immune to any amplitude imbalance between sine and cos. The fifth routine 800 approximates the cos(θ) as a constant value over a single excitation cycle, due to the rotor speed being slower than the excitation frequency. The fifth routine 800 uses cosine from the resolver 20 as well as both the sine and cosine of the estimated excitation. Using these three signals, two products are calculated, as follows (810, 820):

$$\text{CosEnv}=\cos(\theta)*\sin(\omega t+\beta)*\sin(\omega t+\varphi) \text{ and}$$

$$\text{CosQuad}=\cos(\theta)*\sin(\omega t+\beta)*\cos(\omega t+\varphi).$$

By trigonometric manipulation, these signals may be equivalently written as follows:

$$\text{CosEnv}=\cos(\theta)*½[\cos(\beta-\varphi)\cos(2\omega t+\beta+\varphi)] \text{ and}$$

$$\text{CosQuad}=\cos(\theta)*½[\sin(2\omega t+\beta+\varphi)+\sin(\beta-\varphi)].$$

From CosEnv and CosQuad, two derived signals CosNum and CosDenom are calculated:

CosNum=CosEnv*CosQuad=cos$(\theta)^{2}$*¼[cos$(\beta-\varphi)$*sin$(2\omega t+\beta+\varphi)$+cos$(\beta-\varphi)$*sin$(\beta-\varphi)$−sin$(2\omega t+\beta+\varphi)$*cos$(2\omega t+\beta+\varphi)$−sin$(\beta-\varphi)$*cos$(2\omega t+\beta+\varphi)$]; and CosDenom=CosEnv$^{2}$+CosQuad$^{2}$=cos$(\theta)^{2}$*¼[cos$(\beta-\varphi)^{2}$−2*cos$(\beta-\varphi)$*cos$(2\omega t+\beta-\varphi)$+cos$(2\omega t+\beta-\varphi)^{2}$+sin$(2\omega t+\beta-\varphi)^{2}$+2*sin$(\beta-\varphi)$*sin$(2\omega t+\beta+\varphi)$+sin$(\beta-\varphi)^{2}$].

The signal CosDenom can be further reduced as follows:

cos$(\theta)^{2}$*¼[2+2*sin$(\beta-\varphi)$*sin$(2\omega t+\beta-\varphi)$−2*cos$(\beta-\varphi)$*cos$(2\omega t+\beta+\varphi)$]

using the identity sin$(u)^{2}$+cos$(u)^{2}$=1 on the two sets of squared terms located inside the brackets.

Next, CosNum and CosDenom are passed through a moving average over the 16 samples per excitation cycle (830). The 2ωt terms in each signal are averaged to zero, using the assumption that cos(θ) is approximately constant over an excitation cycle. Then what remains of each signal is as follows:

CosNum=cos$(\theta)^{2}$*¼*cos$(\beta-\varphi)$*sin$(\beta-\varphi)$ and

CosDenom=cos$(\theta)^{2}$*¼*2=cos$(\theta)^{2}$*½.

The CosNum term is divided by CosDenom in order to eliminate cos$(\theta)^{2}$ (this can only be done when cos$(\theta)^{2} \neq 0$).

The resulting signal is $\frac{1}{2}*\cos(\beta-\varphi)*\sin(\beta-\varphi)$, which becomes $\frac{1}{4}\sin(2\beta-2\varphi)$ when using the identity $\sin(2u)=2*\cos(u)*\sin(u)$. The term $\frac{1}{4}\sin(2\beta-2\varphi)$ is approximated as follows:

$$\frac{1}{4}\sin(2\beta-2\varphi) \approx \frac{1}{2}(\beta-\varphi)$$

using small angle approximation, and a gain term is applied (540).

This relationship provides a term proportional to the error ($\beta-\varphi$) between the resolver phase shift $\beta$ and the estimated phase shift correction $\varphi$. This error term is integrated (845) and added to the estimated phase shift correction $\varphi$, as part of the excitation phase 805 such that the estimated phase shift correction $\varphi$ will converge on the resolver phase shift $\beta$ over multiple iterations of the fifth routine 800 (850). Thus, a phase shift error term may be determined based upon the moving averages in conjunction with other arithmetic operations and trigonometric manipulations, and a phase shift may be determined between the sinusoidal excitation signal and the corresponding output signals based upon the phase shift error term.

Figure 9:
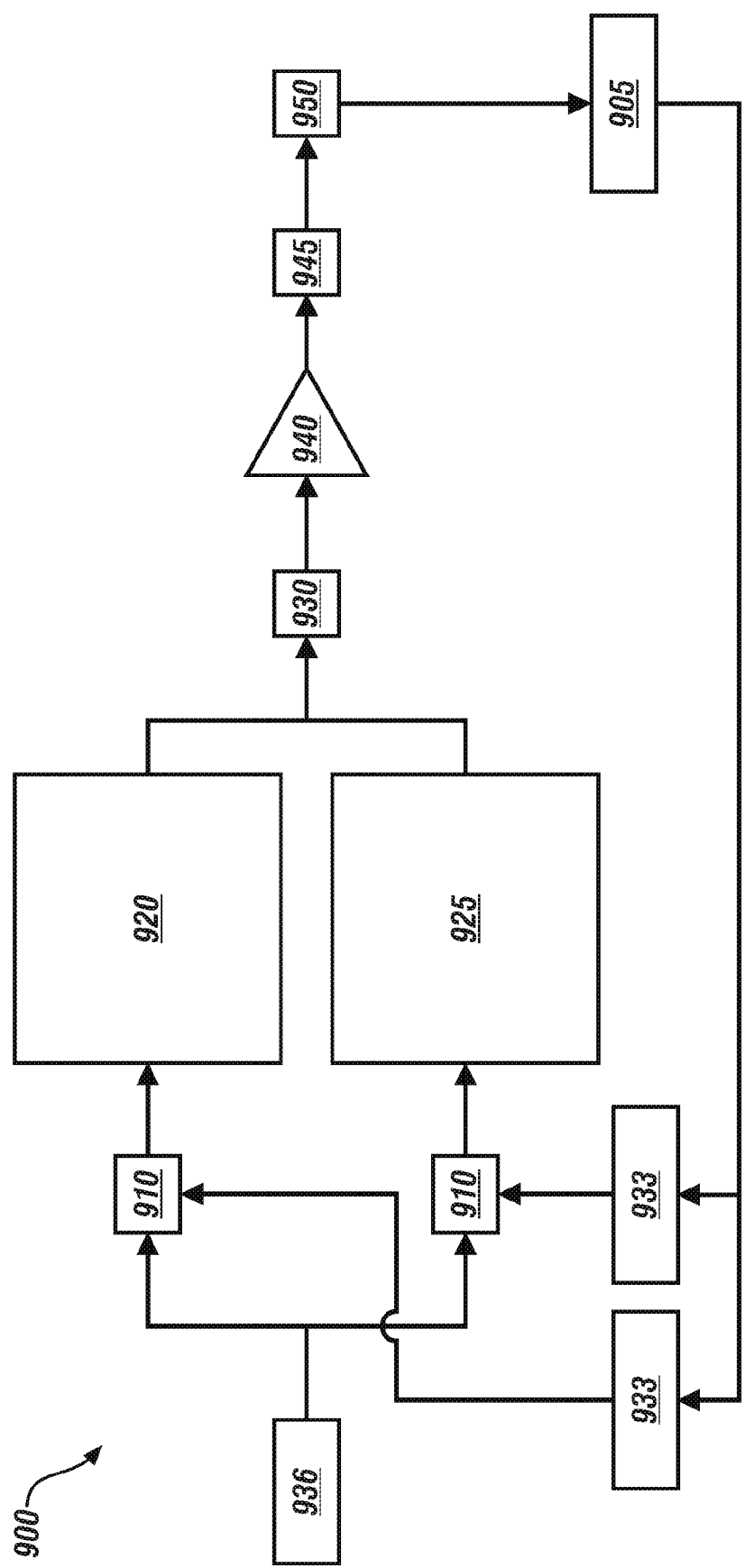

FIG. 9 schematically shows an embodiment of another phase shift determination and compensation routine (sixth routine) 900 in block diagram form that monitors and processes signal outputs from the resolver 20 to determine and compensate for an angular phase shift between the sinusoidal excitation signal and resultant first and second output signals from the resolver 20. The sixth routine 900 may be executed as one or more algorithms or control routines in an embodiment of the controller 50 to process signal outputs from the resolver 20 that is described with reference to FIG. 1. In operation, this includes dynamically supplying a sinusoidal excitation signal 933 to the resolver 20 from an excitation phase 905 and monitoring the output signal cosine 936 collected from the second secondary winding 26 of the resolver 20. A plurality of datasets are determined, wherein each dataset includes digitized states of the sinusoidal excitation signal 933 and the time-correspondent second output signal cosine 936 from the resolver 20.

This method uses cosine 936 from the resolver 20 as well as both the sine and cosine of the estimated excitation signal 933. It employs the same trigonometric manipulations as described with reference to the fifth routine 800, but moving averages are performed closer to the inputs. Since only cosine (and not sine) is used in this method, it is immune to any amplitude imbalance between sine and cos. Like the fifth routine 800, the sixth routine 900 approximates the $\cos(\theta)$ as a constant over a single excitation cycle, due to the rotor speed being substantially slower than the excitation frequency. The products CosEnv and CosQuad are calculated (910) as described with reference to the fifth routine 800, and then both signals are passed through a moving average over the 16 samples per excitation cycle (920, 925). The $2\omega t$ terms in each signal are averaged to zero, using the assumption that $\cos(\theta)$ is approximately constant over an excitation cycle (930). Then what remains of each signal is as follows:

$$\text{CosEnv}=\cos(\theta)*\tfrac{1}{2}*\cos(\beta-\varphi) \text{ and}$$

$$\text{CosQuad}=\cos(\theta)*\tfrac{1}{2}*\sin(\beta-\varphi).$$

From CosEnv and CosQuad, two derived signals CosNum and CosDenom are calculated as follows:

$$\text{CosNum}=\text{CosEnv}*\text{CosQuad}=\cos(\theta)^2*\tfrac{1}{4}*\sin(\beta-\varphi)*\cos(\beta-\varphi) \text{ and}$$

$$\text{CosDenom}=\text{CosEnv}^2+\text{CosQuad}^2=\cos(\theta)^2*\tfrac{1}{4}*\sin(\beta-\varphi)^2+\cos(\theta)^2*\tfrac{1}{4}*\cos(\beta-\varphi)^2=\cos(\theta)^2*\tfrac{1}{4}[\sin(\beta-\varphi)^2+\cos(\beta-\varphi)^2].$$

The term CosDenom can be further reduced to $\cos(\theta)^2*\frac{1}{4}$ using the identity $\sin(u)^2+\cos(u)^2=1$ on the set of squared terms located inside the brackets. Finally, CosNum is divided by CosDenom in order to eliminate $\cos(\theta)^2$, which can only be done when $\cos(\theta)^2 \neq 0$. The resulting signal is $\sin(\beta-\varphi)*\cos(\beta-\varphi)$ which, using the identity $\sin(2u)=2*\cos(u)*\cos(u)$, becomes $\frac{1}{2}\sin(2\beta-2\varphi)$. Using the small angle approximation, $\frac{1}{2}\sin(2\beta-2\varphi) \approx (\beta-\varphi)$, and a gain term is applied (940).

This relationship provides a term proportional to the error ($\beta-\varphi$) between the resolver phase shift $\beta$ and the estimated phase shift correction $\varphi$. This error term is integrated (945) and added to the estimated phase shift correction $\varphi$, as part of the excitation phase 905 such that the estimated phase shift correction $\varphi$ will converge on the resolver phase shift $\beta$ over multiple iterations of the sixth routine 900 (950). Thus, a phase shift error term may be determined based upon the moving averages in conjunction with other arithmetic operations and trigonometric manipulations, and a phase shift may be determined between the sinusoidal excitation signal and the corresponding second output signal based upon the phase shift error term.

The routines described herein provide an accurate, signed estimate of the phase shift $\beta$, which may be applied to a synthesized excitation signal to enable accurate demodulation and subsequent extraction of speed and position information for demodulation in a software resolver-to-digital (RDC) application. The development and enablement of an accurate software RDC application eliminates a need to employ a specialized integrated circuit in the form of an RDC chip in the motor controller 40.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for evaluating an output signal from a resolver coupled to a rotatable member, the method comprising:
supplying an excitation signal to the resolver and dynamically determining corresponding output signals from the resolver;
supplying an excitation signal to the resolver comprises supplying a sinusoidal excitation signal to the resolver;
determining a plurality of datasets, each dataset including digitized states of the excitation signal supplied to the resolver and the corresponding output signals from the resolver;
arithmetically combining the digitized states of the excitation signal and the corresponding output signals from the resolver for the datasets;
determining a moving average of the arithmetically combined digitized states of the excitation signal and the corresponding output signals from the resolver;
determining a phase shift error term based upon the moving average; and determining a phase shift between the excitation signal and the corresponding output signals based upon the phase shift error term.

2. The method of claim 1, wherein dynamically determining corresponding output signals from the resolver comprises dynamically determining corresponding sine and cosine output signals from the resolver.

3. The method of claim 1, wherein dynamically determining corresponding output signals from the resolver comprises dynamically determining corresponding sine output signals from the resolver.

4. The method of claim 1, wherein dynamically determining corresponding output signals from the resolver comprises dynamically determining corresponding cosine output signals from the resolver.

5. The method of claim 1, wherein determining a moving average of the arithmetically combined digitized states of the excitation signal and the corresponding output signals from the resolver comprises determining the moving average for a single period of the excitation signal.

6. The method of claim 1, wherein determining a phase shift between the excitation signal and the corresponding output signals based upon the phase shift error term comprises integrating the phase shift error term.

7. The method of claim 1, further comprising determining the phase shift error term based upon the moving average and arithmetic operations and trigonometric manipulations.

8. A method for evaluating an output signal from a variable reluctance resolver rotatably coupled to a rotatable member of an electric machine, the method comprising:
supplying a sinusoidal excitation signal to an excitation winding disposed on a stator of the variable reluctance resolver;
dynamically determining corresponding first and second output signals from respective first and second secondary windings disposed on the stator of the variable reluctance resolver;
determining a plurality of datasets, each dataset including digitized states of the sinusoidal excitation signal and the corresponding first and second output signals;
arithmetically combining the digitized states of the excitation signal and the corresponding first and second output signals for each of the datasets,
determining a moving average of the arithmetically combined digitized states of the excitation signal and the corresponding first and second output signals for a single period of the sinusoidal excitation signal;
determining a phase shift error term based upon the moving average; and
determining a phase shift between the sinusoidal excitation signal and the corresponding first and second output signals based upon the phase shift error term.

9. The method of claim 8, wherein dynamically determining corresponding first and second output signals from corresponding first and second secondary windings disposed on the stator of the variable reluctance resolver comprises dynamically determining sine and cosine output signals, respectively.

10. The method of claim 8, wherein determining a moving average of the arithmetically combined digitized states of the excitation signal and the respective output signals comprises determining a moving average for a single period of the excitation signal.

11. The method of claim 8, wherein determining a phase shift between the sinusoidal excitation signal and the corresponding first and second output signals based upon the phase shift error term comprises integrating the phase shift error term.

12. The method of claim 8, further comprising determining the phase shift error term based upon the moving average and arithmetic operations and trigonometric manipulations.

13. A controller for monitoring a resolver rotatably coupled to a rotatable member of an electric machine, wherein the resolver includes an excitation winding and first and second secondary windings, comprising:
a microprocessor circuit including a dual-core central processing unit, a pulse generator and a sigma-delta analog-to-digital converter (SDADC) that communicate via a communication bus;
an interface circuit connected to the excitation winding and first and second secondary windings of the resolver; and
an instruction set, the instruction set executable to:
supply an excitation signal to the excitation winding of the resolver and determine corresponding output signals from the first and second secondary windings of the resolver,
determine a plurality of datasets, each dataset including digitized states of the excitation signal and the corresponding output signals,
arithmetically combine the digitized states of the excitation signal and the corresponding output signals for the datasets,
determine a moving average of the arithmetically combined digitized states of the excitation signal and the corresponding output signals,
determine a phase shift error term based upon the moving average, and
determine a phase shift between the excitation signal and the corresponding output signals based upon the phase shift error term.

14. The controller of claim 13, wherein the controller does not include a resolver-to-digital converter (RDC) integrated circuit.

15. The controller of claim 13, wherein the pulse generator supplies the excitation signal to the resolver, and wherein the excitation signal comprises a sinusoidal excitation signal.

16. The controller of claim 13, wherein the instruction set dynamically determines corresponding output signals in the form of corresponding sine and cosine output signals from the resolver.

17. The controller of claim 13, wherein the instruction set determines a moving average of the arithmetically combined digitized states of the excitation signal and the corresponding output signals from the resolver comprises determining the moving average for a single period of the excitation signal.

18. The controller of claim 13, wherein the controller integrates the phase shift error term to determine the phase shift between the excitation signal and the corresponding output signals.

19. The controller of claim 13, wherein the resolver is a variable reluctance resolver.

* * * * *